(12) United States Patent
Moriya

(10) Patent No.: US 8,385,614 B2
(45) Date of Patent: Feb. 26, 2013

(54) SLICE IMAGE DISPLAY APPARATUS, METHOD AND RECORDING-MEDIUM HAVING STORED THEREIN PROGRAM

(75) Inventor: Yoshiyuki Moriya, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 712 days.

(21) Appl. No.: 12/385,549

(22) Filed: Apr. 10, 2009

(65) Prior Publication Data

US 2009/0257550 A1    Oct. 15, 2009

(30) Foreign Application Priority Data

Apr. 11, 2008    (JP) .................................. 2008-103056

(51) Int. Cl.
*G06K 9/00* (2006.01)

(52) U.S. Cl. ........ 382/128; 382/131; 382/132; 382/154; 345/424; 378/21; 378/22; 378/23; 378/24; 378/25

(58) Field of Classification Search .................. 382/128, 382/131, 132, 154; 345/424; 378/21–27
See application file for complete search history.

(56) References Cited

U.S. PATENT DOCUMENTS

| | | | |
|---|---|---|---|
| 2002/0006216 A1* | 1/2002 | Armato et al. | 382/131 |
| 2003/0099391 A1* | 5/2003 | Bansal et al. | 382/131 |
| 2004/0184647 A1* | 9/2004 | Reeves et al. | 382/131 |
| 2005/0063579 A1* | 3/2005 | Lee et al. | 382/131 |
| 2006/0050939 A1* | 3/2006 | Wiemker | 382/128 |
| 2006/0066615 A1* | 3/2006 | Shen | 345/424 |
| 2007/0019849 A1* | 1/2007 | Kaufman et al. | 382/128 |
| 2007/0269089 A1 | 11/2007 | Sakaida | |
| 2008/0267481 A1 | 10/2008 | Nakamura | |
| 2010/0016658 A1* | 1/2010 | Zou et al. | 382/128 |

FOREIGN PATENT DOCUMENTS

| | | |
|---|---|---|
| JP | 6-337920 | 12/1994 |
| JP | 2008-253293 | 10/2008 |

OTHER PUBLICATIONS

K. Kubota et al., "Evaluation of Computer-Aided Diagnosis system for Lung Cancer based on Helical CT images".
The Institute of Electronics, Information and Communication Engineers (IEICE), Technical Report of IEICE, MI2001-41 (Sep. 2001), pp. 41-46.
T. Kitasaka et al., "Experiment of the extraction of aorta and pulmonary artery in the mediastinum from 3D chest X-ray CT images".
The Institute of Electronics, Information and Communication Engineers (IEICE), Technical Report of IEICE, MI2001-69 (Jan. 2002), pp. 65-70.
T. Hayashi et al., "Primary Investigation on Classification of Lung Field Based on Bronchus Using Chest Multi-slice CT Images".
The Institute of Electronics, Information and Communication Engineers (IEICE), Technical Report of IEICE, MI2002-79 (Nov. 2002), pp. 57-62.

* cited by examiner

*Primary Examiner* — Georgia Y Epps
*Assistant Examiner* — Kevin Wyatt
(74) *Attorney, Agent, or Firm* — Jean C. Edwards, Esq.; Edwards Neils PLLC

(57) ABSTRACT

A shadow area in a lung-field area of a subject is detected from tomographic images constituting a three-dimensional image representing the subject. A hilum-of-lung area in the lung-field area of the subject is detected from the tomographic images. Further, a slice image that passes through a first point that is a predetermined point in the detected shadow area, a second point that is a predetermined point in the detected hilum-of-lung area, and an arbitrary point that has been set in advance is generated. The generated slice image is displayed.

7 Claims, 4 Drawing Sheets

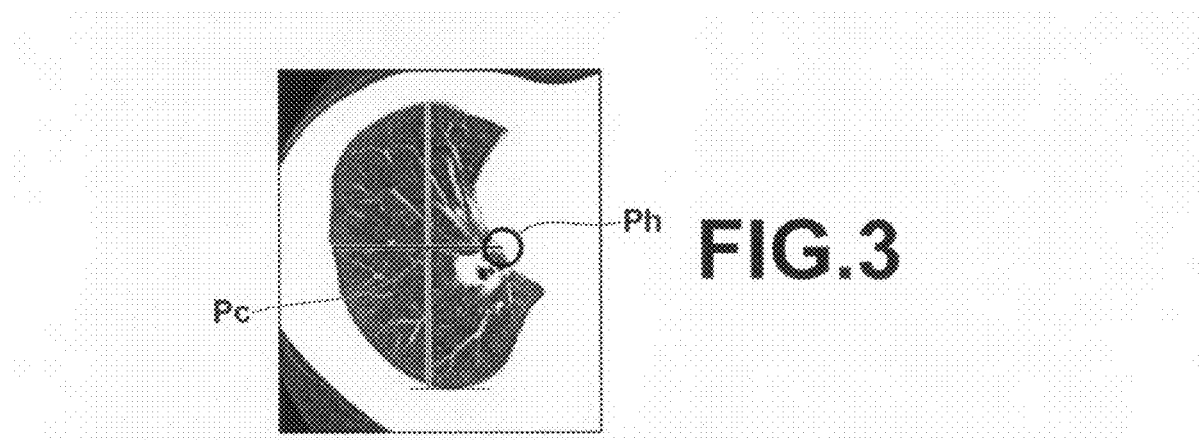
FIG.3
FIG.4
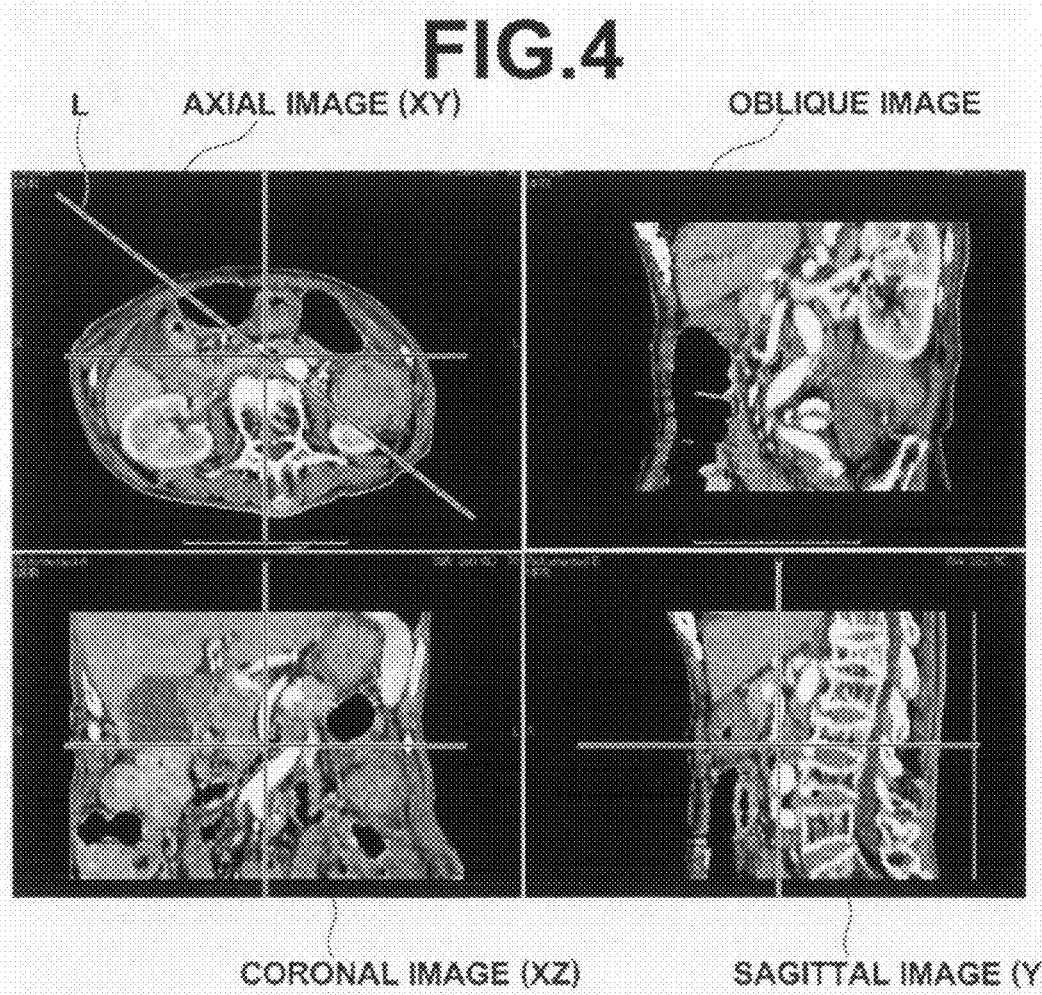

SLICE IMAGE DISPLAY APPARATUS, METHOD AND RECORDING-MEDIUM HAVING STORED THEREIN PROGRAM

CROSS-REFERENCE TO RELATED APPLICATIONS

The present application claims priority from Japanese Patent Application No. 2008-103056, filed Apr. 11, 2008, the contents of which are herein incorporated by reference in their entirety.

BACKGROUND OF THE INVENTION

1. Field of the Invention

The present invention relates to a slice image display apparatus and method for displaying a slice image based on voxel data that represents spatial distribution of an object as a three-dimensional image. Further, the present invention relates to a computer-readable recording medium having stored therein a program for the apparatus and method.

2. Description of the Related Art

In recent years, as CT (computed tomography) apparatuses and the like have been developed, it has become possible to obtain tomographic images that accurately represent anatomical structures of human bodies. Further, three-dimensional images have been reconstructed based on a plurality of tomographic images obtained by imaging a subject at different sectional positions (slice positions).

In a method for displaying a three-dimensional medical image, the three-dimensional medical image is generally handled as a three-dimensional array of voxels having voxel values (pixel values) corresponding to the structures of a subject. In one of major methods for displaying the three-dimensional medical image, an arbitrary slice plane of the three-dimensional array of voxels is displayed by performing slice-plane transformation processing (for example, Multi-Planner Reconstruction, hereinafter, referred to as MPR).

When a doctor or the like diagnoses a patient by using image data obtained by imaging by a CT apparatus or the like, they observe slice images generated by performing MPR processing. In many cases, an axial image or a coronal image on a plane parallel to a CT image, or a sagittal image on a plane perpendicular to the plane parallel to the CT image or the like is generated as a slice image, because such slice planes can be easily set.

However, in actual diagnosis, there is a demand for observation of arbitrary slice images that are called as oblique images. When a shadow that is likely to be a node (knot) is found, the inclination angle (inclination direction or the like) of the slice image is changed in the vicinity of the shadow by using a mouse or the like to observe slice images.

For example, Japanese Unexamined Patent Publication No. 6(1994)-337920 proposes a method for generating an arbitrary new slice image that passes through a region of interest in the slice image and that has been rotated by a predetermined angle.

In the method proposed in Japanese Unexamined Patent Publication No. 6(1994)-337920, slice images are generated based on operations of changing the inclination angles of the slice images by a mouse or the like. The inclination angles are changed to all angles, using a region of interest in the slice images as a base point. Further, the operations must be repeated, and that is troublesome.

SUMMARY OF THE INVENTION

In view of the foregoing circumstances, the inventor of the present invention has noted that when blood (nutrition) is being sent to a node through blood vessels, the probability that the node is malignant is high, and therefore, observation of the connection condition between the node and the blood vessels is essential to recognize the pathological condition of a patient. It is an object of the present invention to provide a slice image display apparatus and method that can more conveniently generate slice images based on a predetermined point in a hilum-of-lung area and a predetermined point in a shadow area.

A slice image display apparatus according to the present invention is a slice image display apparatus comprising:

a shadow area detection unit that detects a shadow area in a lung-field area of a subject from tomographic images on predetermined sectional planes, the tomographic images constituting a three-dimensional image representing the subject;

a hilum-of-lung area detection unit that detects a hilum-of-lung area in the lung-field area of the subject from the tomographic images;

a slice image generation unit that generates a slice image that passes through a first point that is a predetermined point in the detected shadow area, a second point that is a predetermined point in the detected hilum-of-lung area, and an arbitrary point that has been set in advance; and a display unit that displays the slice image generated by the slice image generation unit.

The slice image display apparatus according to the present invention may further include a changed-point generation unit that generates a changed point by changing the arbitrary point that has been set in advance. Further, the slice image generation unit may generate a new slice image that passes through the first point, the second point and the changed point.

The "slice image generation unit" generates a slice image in a desired direction of a subject. The "slice image generation unit" may have a function for transforming the slice image by MPR or the like to display the transformed image. Alternatively, the "slice image generation unit" may have an MPVR (partial MIP) function.

It is not necessary that the "subject" is a human (human body). The present invention may be applied to a subject that is an animal or the like.

The "hilum-of-lung area" represents an area (a region) in the vicinity of the entrance of the trachea to the lung of the subject (patient).

The "second point" is a predetermined point in the hilum-of-lung area. For example, the second point may be the center of gravity of the hilum-of-lung area or region, or the center point of the hilum-of-lung area or region. Further, when the detected hilum-of-lung area is a point of one pixel, the hilum-of-lung area per se may be the second point.

Further, the slice image display apparatus according to the present invention may further include a changed-point generation unit that generates two changed points by changing the arbitrary point that has been set in advance and the first point. Further, the slice image generation unit may generate a new slice image that passes through the second point and the two changed points.

Further, the slice image display apparatus according to the present invention may further include an arbitrary-point setting unit that fixes the coordinate position of the first point and the coordinate position of the second point and sets the coordinate position of the arbitrary point in advance in such a manner that the slice image is perpendicular to one of an axial image, a coronal image and a sagittal image of the three-dimensional image.

Further, the slice image display apparatus according to the present invention may further include a pseudo-three-dimensional-lung-field-image generation unit that generates a pseudo-three-dimensional-lung-field-image by performing volume rendering to generate an image of a lung-field region of the subject based on the three-dimensional image. Further, the display unit may generate a synthetic image by combining the pseudo-three-dimensional-lung-field-image and a slice plane that indicates the position of the slice image in the pseudo-three-dimensional-lung-field-image, and display the synthetic image.

The term "volume rendering" means processing for generating a projection pixel based on an opacity value, brightness value or the like that has been set for each voxel constituting a three-dimensional medical image. The projection pixel is generated by sampling an opacity value, brightness value or the like at each search point along a view line and by adding the sampled values. One of the examples of volume rendering is a ray-casting method.

The term "brightness value" means the value of brightness at the search point. The brightness value is calculated from the voxel value of a voxel constituting the three-dimensional image, color information corresponding to the voxel value, illuminance (illumination) that is obtained based on a relationship between the gradient of the image at the search point and a light source or the like.

Further, the "ray-casting method" (ray cast method) means a method for generating a projection image that shows a three-dimensional structure that is present on the inside of an object by projecting the three-dimensional structure onto a projection plane. In the "ray-casting method", an imaginary ray is output from the projection plane to the object, and a three-dimensional image is generated with imaginary light reflected from the inside of the object based on the opacity, the brightness value or the like corresponding to the voxel value.

Further, a slice image display method according to the present invention is a slice image display method, wherein a computer performs the steps of:

detecting a shadow area in a lung-field area of a subject from tomographic images on predetermined sectional planes, the tomographic images constituting a three-dimensional image representing the subject;

detecting a hilum-of-lung area in the lung-field area of the subject from the tomographic images;

generating a slice image that passes through a first point that is a predetermined point in the detected shadow area, a second point that is a predetermined point in the detected hilum-of-lung area, and an arbitrary point that has been set in advance; and displaying the generated slice image.

A computer-readable recording medium having stored therein a program according to the present invention is a computer-readable recording medium having stored therein a program for causing a computer to execute the functions of:

detecting a shadow area in a lung-field area of a subject from tomographic images on predetermined sectional planes, the tomographic images constituting a three-dimensional image representing the subject;

detecting a hilum-of-lung area in the lung-field area of the subject from the tomographic images;

generating a slice image that passes through a first point that is a predetermined point in the detected shadow area, a second point that is a predetermined point in the detected hilum-of-lung area, and an arbitrary point that has been set in advance; and displaying the generated slice image.

According to a slice image display apparatus and method of the present invention and a computer-readable recording medium having stored therein a program for the apparatus and method of the present invention, a shadow area in a lung-field area of a subject is detected from tomographic images on predetermined sectional planes, the tomographic images constituting a three-dimensional image representing the subject. Further, a hilum-of-lung area in the lung-field area of the subject is detected from the tomographic images. Further, a slice image that passes through a first point that is a predetermined point in the detected shadow area, a second point that is a predetermined point in the detected hilum-of-lung area, and an arbitrary point that has been set in advance is generated and displayed. Therefore, it is possible to easily generate and display a slice image that makes it possible to easily recognize blood vessels that radially extend from the hilum of lung and/or the course of a trachea. Further, a positional relationship with a lesion and/or a connection relationship with the lesion can be easily recognized.

Note that those who are skilled in the art would know that the computer-readable recording medium of the present invention is not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 3 is a diagram for explaining a predetermined point in a hilum-of-lung area in a tomographic image in the present invention;

FIG. 4 is a diagram illustrating a slice image and images related to the slice image that are displayed on a display unit of the present invention;

DESCRIPTION OF THE PREFERRED EMBODIMENTS

Hereinafter, an embodiment of the present invention will be described with reference to drawings. In this embodiment, a slice image display apparatus 1 of the present invention generates a slice image from a three-dimensional image and displays the generated slice image.

First, the slice image display apparatus 1 illustrated in FIG. 1 will be described.

Figure 1:
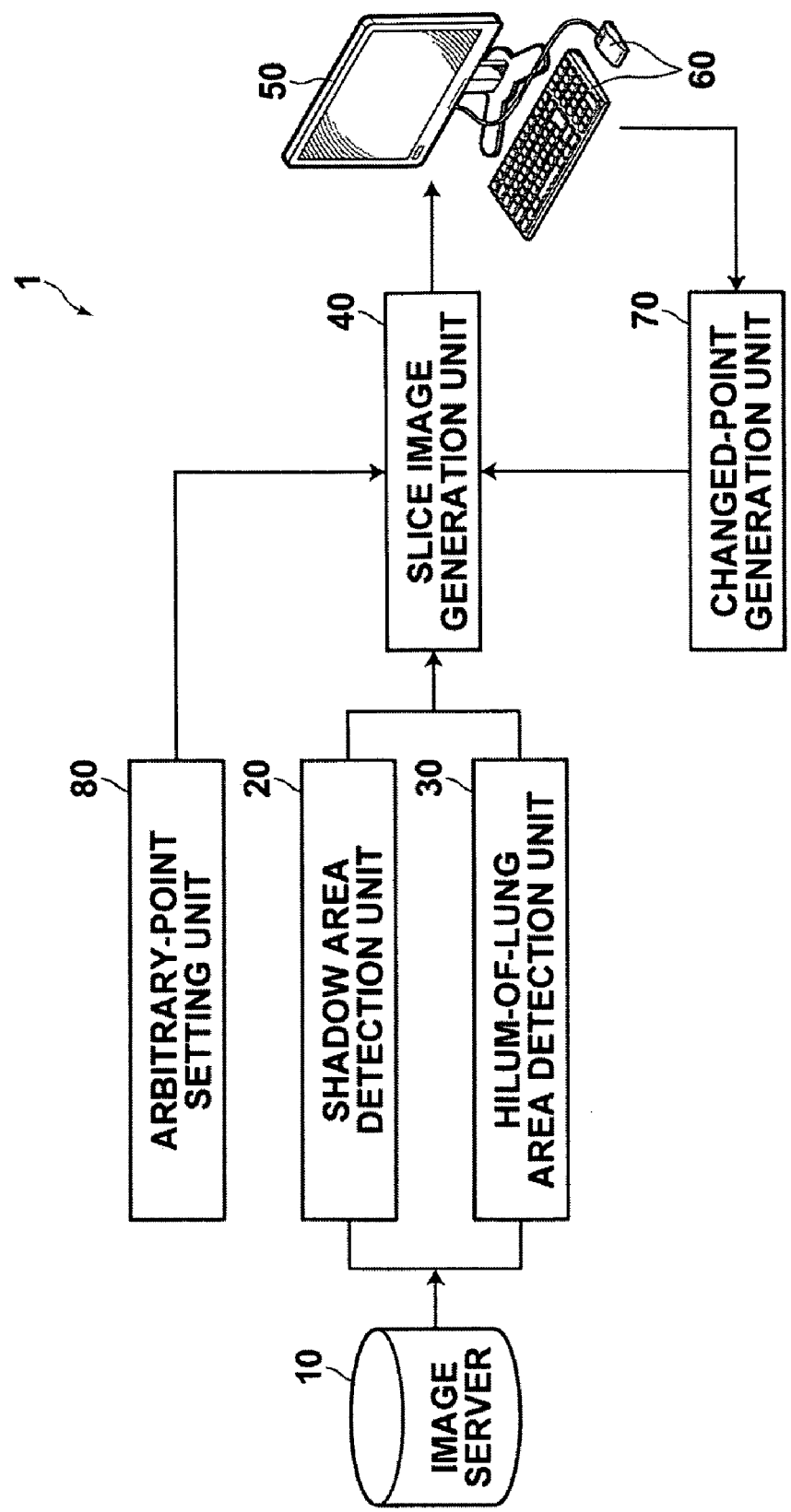
FIG. 1 is a block diagram illustrating an embodiment of a slice image display apparatus according to the present invention.

The slice image display apparatus 1 illustrated in FIG. 1 includes an image server 10, a shadow area detection unit 20, a hilum-of-lung area detection unit 30, an arbitrary-point setting unit 80, a slice image generation unit 40 and a display unit 50. The image server 10 stores a three-dimensional image representing a subject, which is obtained by a CT apparatus or the like. The shadow area detection unit 20 detects a shadow area in a lung-field area of the subject from tomographic images on predetermined sectional planes of the three-dimensional image that is stored in the image server 10. The hilum-of-lung area detection unit 30 detects a hilum-of-lung area in the lung-field area of the subject from the tomographic images. The arbitrary-point setting unit 80 fixes the coordinate position of a first point that is a predetermined point in the shadow area detected by the shadow area detection unit 20 and the coordinate position of a second point that is a predetermined point in the hilum-of-lung area detected by the hilum-of-lung area detection unit 30, and sets the coordinate position of an arbitrary point in advance in such a manner that a slice image generated by the slice image generation unit 40 is perpendicular to one of an axial image, a coronal image and a sagittal image of the three-dimensional image. The slice image generation unit 40 generates the slice image that passes through the arbitrary point that has been set in advance by the arbitrary-point setting unit 80. The display unit 50 displays the slice image generated by the slice image generation unit 40.

The shadow area detection unit 20 may detect a shadow area by applying a method disclosed in K. Kubota et al., "Evaluation of Computer-Aided Diagnosis system for Lung Cancer based on Helical CT Images", The Institute of Electronics, Information and Communication Engineers (IEICE), Technical Report of IEICE, MI2001-41(2001-09), pp. 41-46 (hereinafter, referred to as Reference Literature 1).

The shadow area detection unit 20 includes an image analysis unit (not illustrated) and an image diagnosis unit (not illustrated).

First, the image analysis unit removes the outside of the subject, soft tissue near the body surface of the subject, and the articulationes (joints) such as bones or the like from the tomographic images by threshold-value processing, and recognizes the remaining area as a base lung-field area.

Further, the image analysis unit divides the base lung-field area into a left lung field and a right lung field, and removes areas, such as the trachea, bronchi, esophagus, stomach and intestines, other than the lung field. Further, the image analysis unit classifies the lung field into sections (bronchopulmonal segments or the like), and corrects defects (loss). Further, the image analysis unit performs smoothing processing on the extracted lung field area to remove bias components therefrom. Further, the image analysis unit extracts an ROI (region of interest) by using one of the following two methods.

A fuzzy clustering method is applied to a density histogram of an image of the lung field to divide a high density area in the lung field based on the density of the image to extract an ROI.

Alternatively, areas in the vicinity of the apex of lung and the vicinity of the diaphragm, in which volume effects clearly appear, may be identified by using two kinds of threshold values. Further, density curved-surface classification may be used to extract an ROI.

Finally, density-weighted distance transformation is applied to the ROI, and areas having density distance values greater than or equal to a threshold value are extracted at three levels.

Further, approximately 20 kinds of feature values (for example, a distance to the chest wall, a mean CT value, the area, the density distance value, a ratio with respect to a base area, the degree of circularity, the degree of isolation, the degree of projection and the like) may be obtained for the ROI extracted at each level to use the feature values for diagnostic rules.

Further, the image diagnosis unit detects an abnormal shadow area. First, the image diagnosis unit removes shadows that are not diagnostic targets (objects) based on information analyzed by the image analysis unit. Then, the image diagnosis unit calculates an area that does not contact with the chest wall, and extracts an area that contacts with the chest wall.

As described above, the shadow area detection unit 20 can detect the shadow area.

Meanwhile, the hilum-of-lung area detection unit 30 detects the hilum-of-lung area in the lung field area of the subject from the tomographic images on predetermined sectional planes of the three-dimensional image that is stored in the image server 10.

Figure 5:
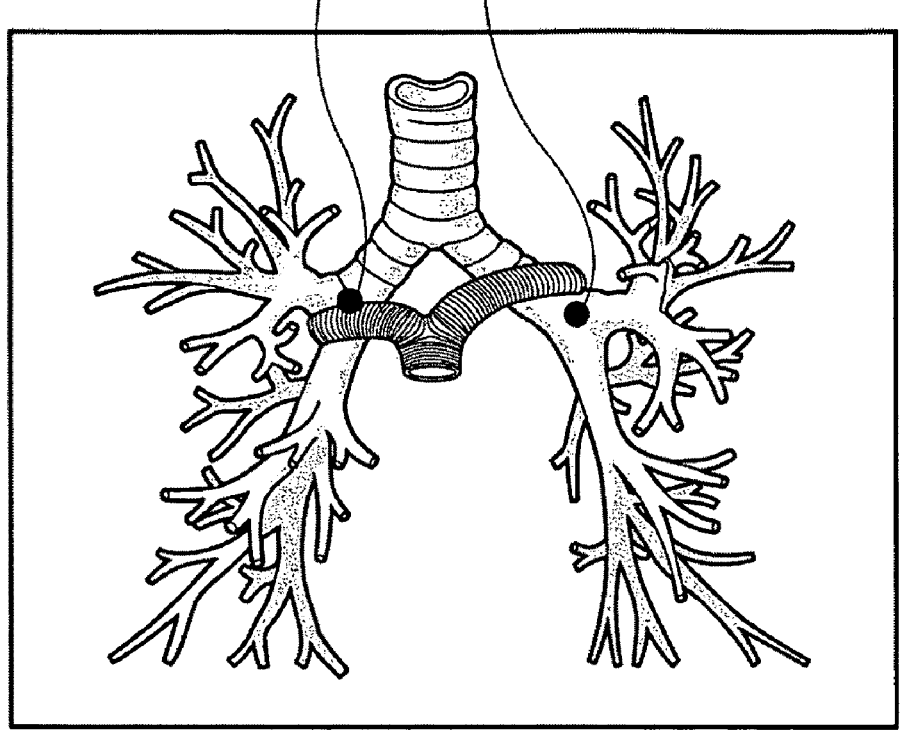
FIG. 5 is a diagram illustrating the bronchi of a subject and examples of a first point according to the present invention.
Figure 6:
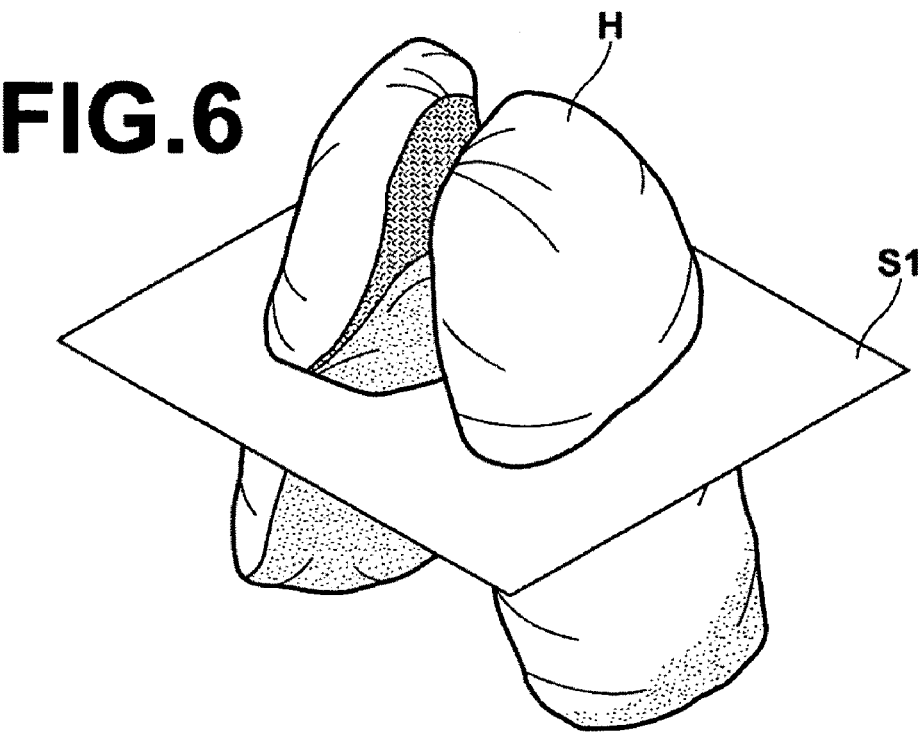
FIG. 6 is a diagram illustrating an example of a pseudo-three-dimensional image and the slice plane of a slice image that are displayed on a display unit of the present invention.

The hilum-of-lung area is a region in the vicinity of the entrance of the trachea to the lung, as illustrated in FIG. 3 (point Ph) and FIG. 5 (points PH1 and PH2). The hilum-of-lung area may be detected as an area including a plurality of pixels (voxels). Alternatively, the hilum-of-lung area may be detected as an area of one pixel (voxel).

The hilum-of-lung detection unit 30 may detect the hilum-of-lung area by using various methods.

For example, a method disclosed in U.S. Patent Application Publication No. 20070269089 (hereinafter, referred to as Reference Literature 2) may be applied to the slice image display apparatus 1 of the present invention.

When the method disclosed in Reference Literature 2 is used, the hilum-of-lung detection unit 30 recognizes, based on the three-dimensional image, regions of the body represented in each of a plurality of tomographic images. The method is performed by causing a CPU to execute the following procedures (a) and (b). In procedure (a), regions of the body represented in the tomographic images are tentatively determined. In procedure (b), a region of the body that has been tentatively determined for at least one tomographic image in procedure (a) is corrected based on information about the plurality of tomographic images. For example, in procedure (a), feature values representing the characteristics of the regions of the body in the tomographic image may be calculated. Further, the regions of the body in the tomographic image may be tentatively determined based on the feature values. Alternatively, in procedure (a), a score table that stores numerical values, each representing the likelihood of the region based on the feature values, may be used to tentatively determine the regions of the body represented in the tomographic images. Alternatively, in procedure (a), a machine learning method including a neural network may be used, and the regions of the body represented in the tomographic images may be tentatively determined based on the calculated feature values.

Further, in procedure (b), a region of the body that has been tentatively determined for at least one tomographic image may be corrected based on the region that has been tentatively determined for each of the plurality of tomographic images in procedure (a). Alternatively, in procedure (b), a region of the body that has been tentatively determined for at least one tomographic image may be corrected based on the positional relationship of the region that has been tentatively determined in each of the plurality of tomographic images in procedure (a), the positional relationship of the region with respect to the direction of the body axis. Alternatively, in procedure (b), a region of the body that has been tentatively determined for at least one tomographic image may be corrected by matching a plurality of regions that have been tentatively determined for each of the plurality of tomographic images in procedure (a) and a plurality of regions for reference related to the subject with each other. Alternatively, in procedure (b), a region of the body that has been tentatively determined for at least one tomographic image may be corrected based on the feature values calculated for each of the plurality of tomographic images in procedure (a). When the subject is a human body, the regions of the body may include the head, the neck, the chest, the abdomen, the pelvis and the legs, and boundary regions of these regions or an overlapping region of a plurality of regions of these regions. The regions of the body may include two or more of these regions.

Further, a method disclosed in U.S. Patent Application Publication No. 20080267481 (hereinafter, referred to as Reference Literature 3) may be applied to the slice image display apparatus 1 of the present invention.

When the method disclosed in Reference Literature 3 is used, the hilum-of-lung area detection unit 30 includes a recognition result display control unit, a correction information input receiving unit, and a region correction unit. The recognition result display control unit displays, on a screen, a plurality of tomographic images representing a plurality of regions of the subject or an image reconstructed based on the plurality of tomographic images. Further, the recognition result display control unit displays, on the screen, a result of processing for recognizing regions of the subject represented in each of the tomographic images. The recognition result display control unit displays the result of recognition processing in which the positional relationship of the regions between the tomographic images, the regions being recognized in each of the tomographic images, and the anatomical positional relationship of a plurality of regions of the subject conform to each other. The correction information input receiving unit receives input of correction information to correct the result of recognition processing. The correction information can identify a correction position that should be the border between different regions. The region correction unit determines an error recognition tomographic image, the recognition result of which is wrong, and a correct recognition result representing a correct region in the error recognition tomographic image. The region correction unit determines the error recognition tomographic image and the correct recognition result based on at least one of the anatomical positional relationship of each region of the subject and the result of recognition processing for a tomographic image or images in the vicinity of the correction position and the input correction information. Further, the region correction unit corrects the result of the recognition processing for the error recognition tomographic image to the correct recognition result.

An example of the "image reconstructed based on the plurality of tomographic images" is an image reconstructed by performing a known MPR (Multi-Planar Reconstruction) processing on the plurality of tomographic images. The observation directions of the reconstructed images are different from those of the tomographic images. For example, the observation directions of the reconstructed images are the coronal direction, the sagittal direction or the like.

Further, the "result of processing for recognizing regions of the subject represented in each of the tomographic images" is based on the premise that "the positional relationship of the regions between the tomographic images, the regions being recognized in each of the tomographic images, and the anatomical positional relationship of a plurality of regions of the subject conform to each other". The regions may be recognized, for example, in the following manner. First, regions of the subject (sample) represented in each of the tomographic images are preliminarily recognized based on the content characteristic of each of the plurality of tomographic images. Further, the region of the subject represented in each of the tomographic images is determined based on the result of preliminary recognition of at least one of tomographic images present on at least one of the preceding side and the subsequent side of each of the tomographic images and the anatomical positional relationship of each region of the subject. The region of the subject represented in each of the tomographic images is determined in such a manner that the conformity of the anatomical positional relationship with the at least one of the tomographic images is maintained. Here, examples of the "content characteristic" are a pixel value or pixel values of a small area set in the tomographic image, a statistic value, such as an average value of pixel values, the ratio of an air area or a bone area in the body area, the shape of the body area and the like. Further, examples of the "preliminary recognition" processing are a method using a classifier obtained by machine learning using AdaBoost, support vector machine (SVM), relevance vector machine (RVM), artificial neural network (ANN) or the like, and a method using template matching or comparison processing with a specific image (unique image).

Further, the "anatomical positional relationship" means the order of arrangement of body regions. For example, if the subject is a human body, the arrangement from the top to the bottom of the body region is the head, the neck, the chest, the abdomen, the pelvis and the legs. Further, an example of the processing for "determining the region of the subject represented in each of the tomographic images in such a manner that the conformity of the anatomical positional relationship is maintained" is a method using a dynamic planning method.

Further, an example of the method for "correcting the result of the recognition processing for the error recognition tomographic image to the correct recognition result" is a method for detecting, based on the result of recognition processing for tomographic images in the vicinity of the input correction position, the positions of borders between different regions that have been obtained by recognition processing. The positions of the borders are detected on both sides of the input correction position. Further, a tomographic image that is present between one of the detected positions of the borders that is closer to the correction position and the correction position is judged as an error recognition tomographic image. Further, the result of recognition processing for a region in one of tomographic images that are adjacent to the position of the border closer to the correction position, the one of tomographic images that is not the error recognition tomographic image, is used as the correct recognition result to correct the result. In this case, the correction position may be input by inputting the position of the border per se. Alternatively, the correction position may be input by specifying at least one of the tomographic images adjacent to the border. In the latter case, whether the border is present on the preceding side of the tomographic image or the subsequent side of the tomographic image may also be input. Alternatively, the preceding side or the subsequent side of the tomographic image, the side having been determined in advance, may be recognized as the border.

Further, input may be performed in such a manner to specify a tomographic image that is adjacent to the border, and the recognition result of which is wrong. In this case, the specified tomographic image should be included in the error recognition tomographic image to perform correction. Alternatively, a tomographic image adjacent to the border, the recognition result of which is correct, may be specified. In that case, correction processing should be performed without including the specified tomographic image in the error recognition tomographic image.

Further, input of one of tomographic images adjacent to the correction position, the one of tomographic images the result of recognition processing of which is wrong, and correction information including a correct region in the one of tomographic images may be received. Further, a correct tomographic image, in which the region obtained by recognition processing is the same as the input correct region, may be detected from tomographic images in the vicinity of the input tomographic image. Further, a tomographic image or images between the correct tomographic image and the input tomographic image the result of recognition processing of which is wrong, and the input tomographic image may be recognized as the error recognition tomographic images. Further, the input correct region may be used as the correct recognition result to perform correction processing.

In this case, a border between the input tomographic image and a tomographic image that is adjacent to the input tomographic image, the tomographic image positioned on a side opposite to the correct-tomographic-image-side of the input tomographic image, is the correction position that should be the border between different regions. Therefore, the input correction information can be an example of information that is used to identify the correction position.

Alternatively, an input similar to the above input may be received, and tomographic images in the vicinity of the input tomographic image may be judged. A tomographic image or images in which the positional relationship between the region obtained by the recognition processing on the tomographic images in the vicinity of the input tomographic image and the input correct region does not conform to the anatomical positional relationship of the subject are judged as the error recognition tomographic image or images. Further, the input correct region may be used as the correct recognition result, and correction may be performed.

When this method is used, a border between the input tomographic image and one of two tomographic images adjacent to the input tomographic image is the correction position that should be the border between different regions. The one of two tomographic images is a tomographic image, in which the positional relationship between the region obtained by recognition processing on the tomographic image and the correct region in the input tomographic image conforms to the anatomical positional relationship of the subject. Therefore, the input correction information can be an example of information that is used to identify the correction position.

Further, correction information representing a range including a plurality of tomographic images may be received. The plurality of tomographic images start at the correction position specified according to a predetermined order and reach a tomographic image the result of recognition processing of which is correct. Further, the plurality of tomographic images include tomographic images the results of recognition processing of which are wrong between the correction position and the tomographic image the result of recognition processing of which is correct. Further, the tomographic image the result of recognition processing of which is correct is identified based on a predetermined order. Further, a region recognized in the tomographic image the result of recognition processing of which is correct is recognized as the correct recognition result. Further, in the input range, a tomographic image the recognition result of which is different from the correct recognition result may be judged as an error recognition tomographic image to perform correction processing. Further, in this case, a border between a tomographic image the recognition result of which is wrong and that is furthest from the tomographic image the recognition result of which is correct and a tomographic image that is adjacent to the furthest tomographic image and that is present on the outside of the range is the correction position that should be a border between different regions. Therefore, the input correction information can be an example of information that can identify the correction position.

Alternatively, input specifying all error recognition tomographic images, the recognition results of which are wrong, may be received. Further, the recognition result of one of two tomographic images adjacent to the specified plurality of error recognition tomographic images on both sides of the specified plurality of error recognition tomographic images may be recognized as the correct recognition result. The one of two tomographic images is a tomographic image the recognition result of which is different from the result of recognition processing in the error recognition tomographic image. Further, the recognition result of the error recognition tomographic image may be corrected using the correct recognition result. In this case, a border between one of two tomographic images adjacent to the specified error recognition tomographic images, the one of two tomographic image having the same result of recognition processing as the error recognition tomographic image, and the error recognition tomographic image adjacent to the one of two tomographic images is the correction position that should be the border between different regions. Therefore, the input correction information can be an example of information that is used to identify the correction position.

Further, when at least one of the length of a region in tomographic images before correction, the length in a direction perpendicular to the sectional planes of the tomographic images, and the length of a region in tomographic images after correction, the length in the direction perpendicular to the sectional planes of the tomographic images, does not satisfy a predetermined criterion, the region in at least a part of the tomographic images may be corrected again to satisfy the criterion. Here, an example of the predetermined criterion is whether the length is within a range of lengths that are anatomically possible for the region of the subject (sample). Further, the range of the lengths that are anatomically possible for each region may be set in advance in a reference table, a function or the like.

Further, the hilum-of-lung area detection unit 30 may recognize the chest area in the tomographic image by using the method disclosed in Reference Literature 2 or Reference Literature 3. Further, the hilum-of-lung area detection unit 30 may identify center Pc of the vertical axis and the horizontal axis of the chest area of the subject in the recognized chest area, as illustrated in FIG. 3.

Next, a method disclosed in Japanese Unexamined Patent Publication No. 2008-253293 (hereinafter, referred to as Reference Literature 4) will be applied to the slice image display apparatus 1 of the present invention.

When the method disclosed in Reference Literature 4 is used, the hilum-of-lung area detection unit 30 recognizes the left lung field area and the right lung field area in a tomographic image that shows the center identified as described above. Further, the hilum-of-lung area detection unit 30 detects, as a second point, a point at a center of each of the lung fields with respect to the anterior/posterior direction, the point being closest to the center of the subject.

The second point is a predetermined point in the hilum-of-lung area. For example, the second point may be the center of gravity or the center point of the hilum-of-lung area. When the detected hilum-of-lung area is a point of one pixel, the hilum-of-lung area per se may be the second point.

The hilum-of-lung area detection unit 30 binarizes the tomographic image based on the CT values thereof to divide the tomographic image into an air area and a soft tissue area. Further, the hilum-of-lung area detection unit 30 detects the body surface in the soft tissue area. The hilum-of-lung area detection unit 30 judges whether a lost lung field area that contacts with the imaging limit (imaging boundary) of the CT apparatus is present in the air area. If the lost lung field area is present in the air area, the lost lung field area is extracted, and the entire area of the lung field including the lost lung field area is extracted.

Further, the judgment as to whether a lost lung field area that contacts with the imaging limit of the CT apparatus is present may be made based on whether the degree of circularity of the body surface is less than a predetermined value.

Further, if a lesion area is included in the lung field area, the processing may include the step of extracting the entire area of the lung field in such a manner to include neither of the hilum-of-lung area nor the bronchus or bronchi area but to include the lesion area.

Further, when the entire area of the lung field area is extracted so as to include the lesion area, curve interpolation using the curvature of the border of the lung field area, the curvature in the vicinity of a dip or hollow portion of the lung field area, may be performed on the dip or hollow portion of the lung field area, which is the lesion area. The interpolated area may be included in the lung field area, and the entire area of the lung field area including the interpolated area may be extracted.

Further, in the aforementioned curve interpolation, the curvature may smoothly change.

Further, when the left lung field area and the right lung field area are connected to each other, they may be divided into the left lung field area and the right lung field area.

Further, when the left lung field area and the right lung field area are divided, they may be divided at an area in the connection portion of the two lung field areas. The area in the connection portion has CT values greater than or equal to a predetermined threshold value that is less than a threshold value for binary processing and connects the connection portion by a shortest distance.

When the hilum-of-lung area detection unit 30 uses the method disclosed in Reference Literature 4, even if the obtained CT image includes a lost lung field area, in which a part of the lung field area contacts with the imaging limit (FOV: field of view), it is possible to extract the entire area of the lung field including the lost lung field area.

Since the lung field area contacts with the imaging limit FOV of the CT apparatus, the lung field area, which is originally a lung field area, is judged as an area outside the body surface. Therefore, the lung field area is not detected as the lung field area. Such a lung field area is the lost lung field area.

Further, the hilum-of-lung detection unit 30 may apply, as another method for calculating the center that has been identified as described above, the method disclosed in Japanese Patent Application No. 2007-256290 (hereinafter, referred to as Reference Literature 5) to the slice image display apparatus 1 of the present invention.

When the method disclosed in Reference Literature 5 is used, the hilum-of-lung area detection unit 30 binarizes each of the tomographic images based on a predetermined image density value. Further, the hilum-of-lung area detection unit 30 classifies each image in the binarized tomographic images into a first image group and a second image group. The first image group includes images of the inside of the subject, and the second image group includes images of the outside of the subject. The hilum-of-lung area detection unit 30 classifies each image in the binarized tomographic images based on the positional relationship with other image or images in the same tomographic image and the positional relationship with other image or images in other tomographic image or images. Therefore, even if the density of an image, such as an image of the lung, is low, images are accurately classified into images of the inside of the subject based on the positional relationship with other images. Hence, the center of the classified area (for example, the lung or the like) can be calculated.

Further, the hilum-of-lung area detection unit 30 may adopt a method disclosed in T. Kitasaka et al., "Experiment of the extracting of aorta and pulmonary artery in the mediastinum from 3D chest X-ray CT images", The Institute of Electronics, Information and Communication Engineers (IEICE), Technical Report of IEICE, MI2001-69(2002-01), pp. 65-70, (hereinafter, referred to as Reference Literature 6) to calculate, as the second point, an intersection between the core line of the blood vessel and the border of the lung field area in the three-dimensional image. The second point may be calculated for each of the left lung and the right lung.

Further, the hilum-of-lung area detection unit 30 may adopt a method disclosed in T. Hayashi et al., "Primary Investigation on Classification of Lung Field Based on Bronchus Using Chest Multi-slice CT Images", The Institute of Electronics, Information and Communication Engineers (IEICE), Technical Report of IEICE, MI2002-79(2002-11), pp. 57-62, (hereinafter, referred to as Reference Literature 7) to extract the hilum-of-lung area.

The bronchus is recognized by using the method disclosed in Reference Literature 7, and a portion at which each of the left/right bronchi splits into lobar bronchi is judged as the second point. Since the bronchi lie substantially parallel to arteries from the split points, the method disclosed in Reference Literature 7 can be adopted instead of the method disclosed in Reference Literature 6.

Another configuration of the slice image display apparatus 1 illustrated in FIG. 1 includes a changed-point generation unit 70. The changed-point generation unit 70 generates a changed point by changing an arbitrary point that has been set in advance by the arbitrary-point setting unit 80 and/or a first point that is a predetermined point in a shadow area detected by the shadow area detection unit 20. The changed-point generation unit 70 changes the points by an instruction from an instruction unit 60.

The instruction unit 60 may instruct the changed-point generation unit 70 based on a position specified in an input by an operator. The operator uses a position specification unit, such as a mouse and a keyboard, to specify a position as a changed point.

Further, another configuration of the slice image display apparatus 1 includes a pseudo-three-dimensional-lung-field image generation unit (not illustrated). The pseudo-three-dimensional-lung-field image generation unit generates a pseudo-three-dimensional-lung-field image by generating an image of the lung field area of the subject from the three-dimensional image by volume rendering.

In the volume rendering method, a projection pixel is generated based on an opacity value, brightness value or the like that is set for each voxel constituting a three-dimensional medical image. The projection pixel is generated by sampling such values at search points along a view line and by adding the sampled values. One of the examples of volume rendering is a ray-casting method.

Here, the term "brightness value" means the value of brightness at the search point. The brightness value is calculated from the voxel value of a voxel constituting the three-dimensional image, color information corresponding to the voxel value, illuminance (illumination) that is obtained based on a relationship between the gradient of the image at the search point and a light source or the like.

For example, in the "ray-casting method" (ray cast method), a projection image that shows a three-dimensional structure that is present on the inside of an object is generated by projecting the three-dimensional structure onto a projection plane. In the "ray-casting method", an imaginary ray is output from the projection plane to the object, and a three-dimensional image is generated with imaginary light reflected from the inside of the object based on the opacity, the brightness value or the like corresponding to the voxel value.

The configuration of the slice image display apparatus 1 is realized by causing a computer (for example, a personal computer or the like) to execute a slice image display program installed in an auxiliary storage device. At this time, the slice image display program is stored in an information recording medium, such as a CD-ROM (compact disc read-only memory), or distributed through a network, such as the Internet, to be installed in the computer.

Figure 2:
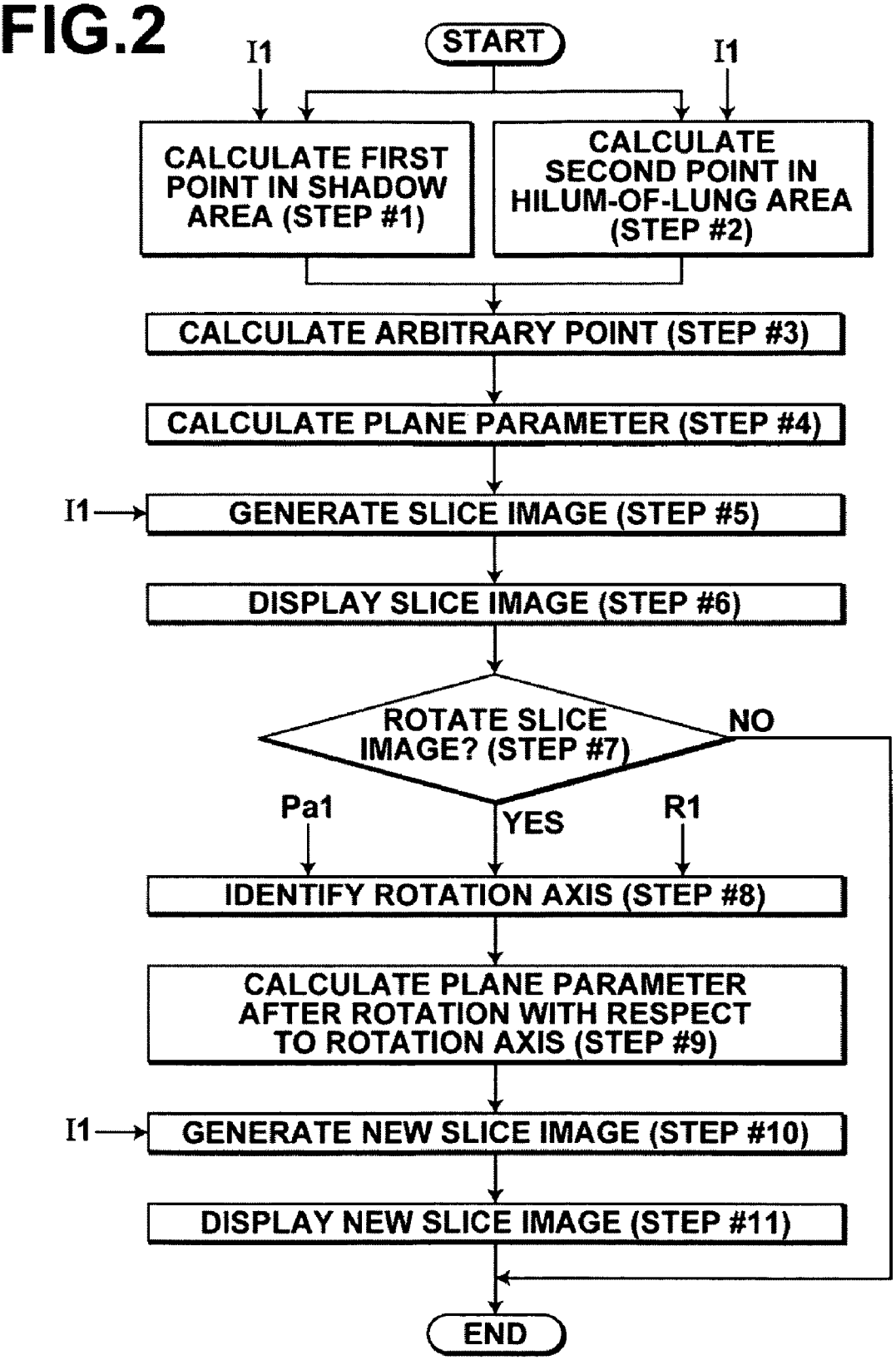
FIG. 2 is a flowchart illustrating an embodiment of a slice image display method according to the present invention.

Next, with reference to the flowchart illustrated in FIG. 2, a method for displaying a slice image according to the present invention will be described.

First, the shadow area detection unit 20 detects a shadow area in a lung-field area of a subject from tomographic images on predetermined sectional planes. The tomographic images constitute a three-dimensional image I1 representing the subject, and the three-dimensional image I1 is stored in the image server 10. Further, the shadow area detection unit 20 calculates a first point that is a predetermined point in the detected shadow area (step #1).

The shadow area detection unit 20 automatically calculates the first point in the detected shadow area. For example, the first point may be the center point or the center of gravity of the detected shadow area.

Further, the shadow area detected by the shadow area detection unit 20 may be displayed on the display unit 50, and the user may specify a predetermined point by the instruction unit 60 to calculate the first point.

Further, when a plurality of shadow areas are detected in the lung field area of the subject, a plurality of first points may be calculated and stored.

Meanwhile, the hilum-of-lung area detection unit 30 detects a hilum-of-lung area in the lung-field area of the subject from the tomographic images on predetermined sectional planes. The tomographic images constitute the three-dimensional image I1 representing the subject, and the three-dimensional image I1 is stored in the image server 10. Further, the hilum-of-lung area detection unit 30 calculates a second point that is a predetermined point in the detected hilum-of-lung area (step #2).

The hilum-of-lung detection unit 30 automatically calculates the second point in the detected hilum-of-lung area as illustrated in FIG. 3. For example, the second point may be the center point or the center of gravity of the detected hilum-of-lung area.

Further, the hilum-of-lung area detected by the hilum-of-lung area detection unit 30 may be displayed on the display unit 20, and the user may specify a predetermined point by the instruction unit 60 to calculate the second point.

The arbitrary-point setting unit 80 calculates an arbitrary point that has been set in advance (step #3).

For example, when an arbitrary slice plane of three-dimensionally-arranged voxels is displayed by slice-plane transformation processing (MPR: Multiplaner Reconstruction), if a normal vector of a plane and a point on a slice image generated by slice-plane transformation processing are set as plane parameters, a slice image is uniquely determined, and generated.

However, it is impossible to uniquely determine an initial normal vector by using only two points that are input information.

Therefore, the arbitrary-point setting unit 80 fixes the coordinate position of the first point, which is calculated by the shadow area detection unit 20, and the coordinate position of the second point, which is calculated by the hilum-of-lung area detection unit 30, and sets the coordinate position of the arbitrary point in advance in such a manner that the slice image is perpendicular to one of an axial image, a coronal image and a sagittal image of the three-dimensional image.

The slice image generation unit 40 calculates plane parameter of the slice plane (step #4), and stores the plane parameter.

For example, when the slice image generation unit 40 calculates plane parameter Pa1 of a plane perpendicular to the axial image, the position of the hilum of lung or a lesion may be used as a point on an MPR image, and the normal vector can be obtained by calculating an exterior product of a vector directing from the hilum of lung to the lesion and the normal vector of the axial image.

The slice image generation unit 40 generates the slice image by slice-plane transformation processing (MPR) so that the slice plane passes through the first point, the second point and the arbitrary point that has been set in advance by the arbitrary-point setting unit 80 (step #5). The first point is a predetermined point in the shadow area, the point having been detected by the shadow area detection unit 20. The second point is a predetermined point in the hilum-of-lung area, the point having been detected by the hilum-of-lung area detection unit 30.

The display unit 50 displays the slice image generated by the slice image generation unit 40 (step #6). The display unit 50 may display not only the slice image (oblique image) but the axial image, the coronal image and the sagittal image related to the slice image at the same time, as illustrated in FIG. 4.

Further, when a plurality of shadow areas are detected in the lung field area of the subject, or when a first point has been stored, if one of the plurality of first points is specified by using the instruction unit 60, it is possible to generate a slice image based on the specified first point, and to display the generated slice image.

Further, when the second point has been calculated for each of the left lung and the right lung, if one of two points of the left lung and the right lung is specified by the instruction unit 60, it is possible to generate a slice image based on the specified second point, and to display the generated slice image.

Next, after the plane parameter Pa1 is stored by the slice image generation unit 40, the user may instruct rotation of the slice image in some cases (step #7).

When the slice image is rotated (step #7; YES), the slice image generation unit 40 generates a new slice image that has been rotated by a predetermined rotation angle R1. The slice image generation unit 40 generates the new slice image by using the slice image generated by the slice image generation unit 40 and an axis that passes through the first point and the second point (hereinafter, referred to as a base axis).

In the present invention, a new slice image that has been rotated is generated by using one of the following two methods.

In the first method, for example, the changed-point generation unit 70 generates two changed points by changing the arbitrary point that has been set in advance by the arbitrary-point setting unit 80 and the first point that has been calculated by the shadow area detection unit 20.

The changed-point generation unit 70 changes the arbitrary point that has been set in advance by the arbitrary-point setting unit 80 and the first point that has been calculated by the shadow area detection unit 20 to two changed-points that are connected by a straight line (hereinafter, referred to as a rotation axis). The straight line (rotation axis) passes through the second point and the straight line is perpendicular to the base axis in the generated slice image (using the plane parameter Pa1). Further, the rotation axis is identified by the two changed-points (step #8).

The slice image generation unit 40 calculates plane parameter Pa2 of the slice image by using the second point and the generated two changed points (step #9), and stores the plane parameter Pa2.

In the second method, for example, the changed-point generation unit 70 identifies the base axis as the rotation axis (step #8).

The changed-point generation unit 70 generates a changed point by changing the arbitrary point that has been set by the arbitrary-point setting unit 80.

The changed-point generation unit 70 calculates plane parameter Pa3 of a slice plane by using the arbitrary point that has been set in advance by the arbitrary-point setting unit 80, the first point that has been calculated by the shadow area detection unit 20 and the second point (step #9), and stores the plane parameter Pa3.

Further, the plane parameters Pa2 and Pa3 calculated by using the first method and the second method are used, and a new slice image is generated as described above (step #10). The new slice image is displayed (step #11).

The display unit 50 may synthesize an image by combining the pseudo-three-dimensional hilum-of-lung image H generated by the pseudo-three-dimensional hilum-of-lung image generation unit and the slice plane S1 of the aforementioned slice image (including the new slice image), and display the synthesized image.

In the slice image display apparatus of the present invention, the hilum-of-lung area in the lung field of the subject is detected from tomographic images. Further, a slice image that passes through the first point that is a predetermined point in the detected shadow area, the second point that is a predetermined point in the detected hilum-of-lung area, and the arbitrary-point that has been set in advance is generated. Further, the generated slice image is displayed. Therefore, it is possible to easily recognize the course of the blood vessels that radially extend from the hilum of lung and/or the bronchi. Further, it is possible to easily generate a slice image that makes it possible to easily recognize the positional relationship with the lesion and/or the connection relationship with the lesion.

What is claimed is:

1. A slice image display apparatus comprising:
    a shadow area detection unit that detects a shadow area in a lung-field area of a subject from tomographic images on predetermined sectional planes, the tomographic images constituting a three-dimensional image representing the subject;
    a hilum-of-lung area detection unit that detects a hilum-of-lung area in the lung-field area of the subject from the tomographic images;
    a slice image generation unit that generates a slice image that passes through a first point that is a predetermined point in the detected shadow area, a second point that is a predetermined point in the detected hilum-of-lung area, and an arbitrary point that has been set in advance; and
    a display unit that displays the slice image generated by the slice image generation unit.

2. A slice image display apparatus, as defined in claim 1, the apparatus further comprising:
    a changed-point generation unit that generates a changed point by changing the arbitrary point that has been set in advance, wherein the slice image generation unit generates a new slice image that passes through the first point, the second point and the changed point.

3. A slice image display apparatus, as defined in claim 1, the apparatus further comprising:
    a changed-point generation unit that generates two changed points by changing the arbitrary point that has been set in advance and the first point, wherein the slice image generation unit generates a new slice image that passes through the second point and the two changed points.

4. A slice image display apparatus, as defined in claim 1, the apparatus further comprising:
    an arbitrary-point setting unit that fixes the coordinate position of the first point and the coordinate position of the second point and sets the coordinate position of the arbitrary point in advance in such a manner that the slice image is perpendicular to one of an axial image, a coronal image and a sagittal image of the three-dimensional image.

5. A slice image display apparatus, as defined in claim 1, the apparatus further comprising:
    a pseudo-three-dimensional-lung-field-image generation unit that generates a pseudo-three-dimensional-lung-field-image by performing volume rendering to generate an image of a lung-field region of the subject based on the three-dimensional image, wherein the display unit generates a synthetic image by combining the pseudo-three-dimensional-lung-field-image and a slice plane that indicates the position of the slice image in the pseudo-three-dimensional-lung-field-image, and displays the synthetic image.

6. A slice image display method, wherein a computer performs the steps of:
    detecting a shadow area in a lung-field area of a subject from tomographic images on predetermined sectional planes, the tomographic images constituting a three-dimensional image representing the subject;
    detecting a hilum-of-lung area in the lung-field area of the subject from the tomographic images;
    generating a slice image that passes through a first point that is a predetermined point in the detected shadow area, a second point that is a predetermined point in the detected hilum-of-lung area, and an arbitrary point that has been set in advance; and
    displaying the generated slice image.

7. A computer-readable recording medium having stored therein a program for causing a computer to execute the functions of:
    detecting a shadow area in a lung-field area of a subject from tomographic images on predetermined sectional planes, the tomographic images constituting a three-dimensional image representing the subject;
    detecting a hilum-of-lung area in the lung-field area of the subject from the tomographic images;
    generating a slice image that passes through a first point that is a predetermined point in the detected shadow area, a second point that is a predetermined point in the detected hilum-of-lung area, and an arbitrary point that has been set in advance; and
    displaying the generated slice image.

* * * * *